UNITED STATES PATENT OFFICE.

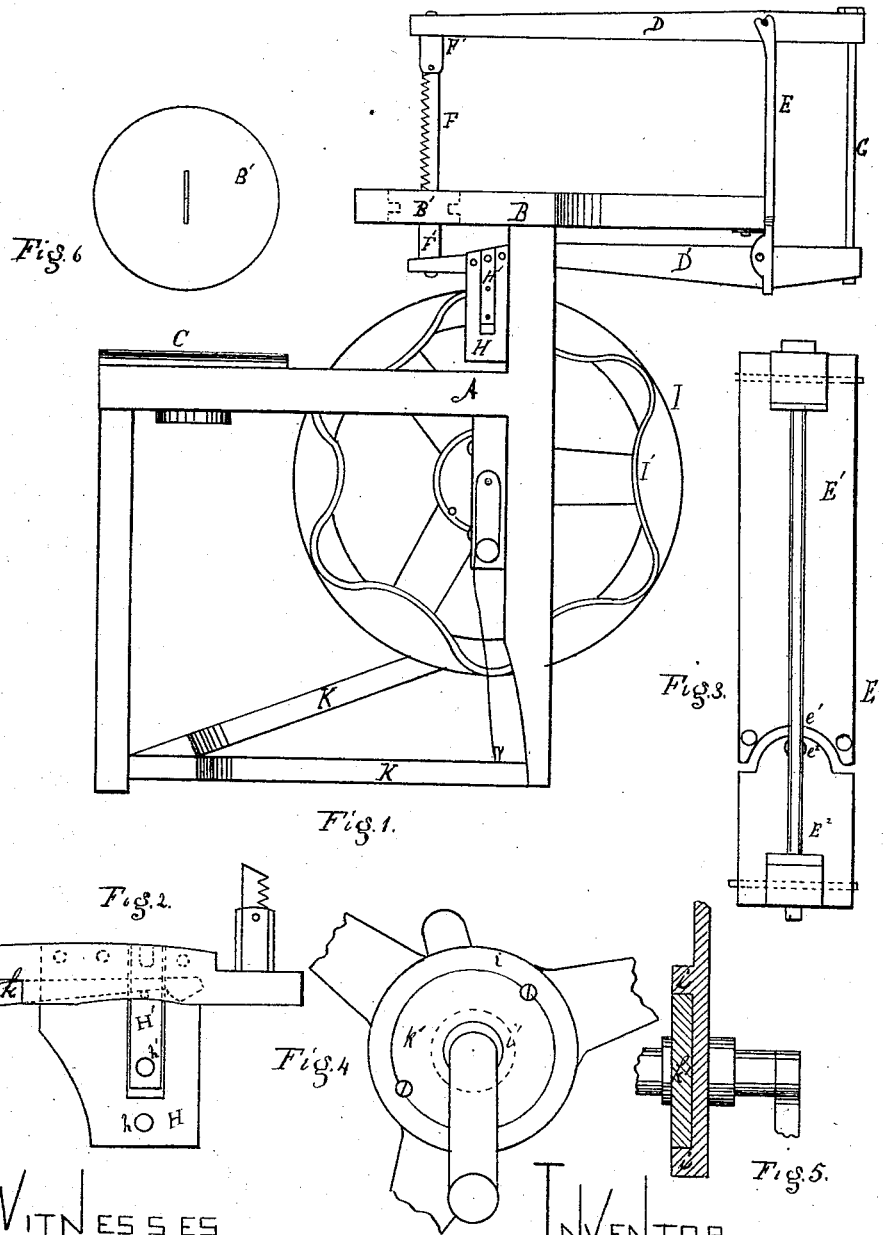

ROBERT McCONNELL, OF PITTSBURG, PENNSYLVANIA.

IMPROVEMENT IN SCROLL-SAWING MACHINES.

Specification forming part of Letters Patent No. 160,217, dated February 23, 1875; application filed August 3, 1874.

*To all whom it may concern:*

Be it known that I, ROBERT MCCONNELL, of Pittsburg, in the county of Allegheny and State of Pennsylvania, have invented a new and useful Improvement in Scroll-Sawing Machines; and I do hereby declare the following to be a full, clear, and exact description thereof, reference being had to the accompanying drawing, forming part of this specification, in which—

Figure 1 is a side view of my improved apparatus. Fig. 2 is a sectional view, showing the method of adjusting the pin-plate. Fig. 3 is a similar view, showing the method of adjusting the saw-beams; and Figs. 4, 5, and 6 are detailed views, showing the construction of the hub of the cam-wheel and the movable saw-bed.

Like letters refer to like parts in the several figures.

My invention relates to certain improvements in scroll-sawing machinery; and it consists, first, in an improved cam-wheel, which, through the medium of a pin-plate or similar device attached to the saw-beam, operates the saw; secondly, in forming the pin-plate attached to the lower saw-beam in two parts, one of which is slotted and provided with a wedge or suitable device, whereby the slack of the pin-plate may be taken up to compensate for the wear of the pin; and, thirdly, in a divided bracket or brace-bar for supporting and adjusting the saw-beam.

In the drawings referred to, A indicates the main frame, which may be of any suitable form to support the operative devices; B, the table, supported above the main frame; C, an adjustable sliding seat, attached to the cross bar of the main frame; D, the upper, and D' the lower, saw-beam, attached to and supported by the adjustable brace E. The upper and lower saw-beams D and D' must be parallel and vertically over one another, in order that the strain upon the saw F may be equal; the beams being connected at the rear by the rod G passing through slots in the ends of the beams, so as to allow of the play of the saw-beams. The saw F is attached to the upper and lower beams by swivel-connections F', so that it may be turned in any and every direction. The saw passes through a circular movable portion, B', of the table B, which turns with and steadies the saw. The brace E is composed of two parts, $E^1$ and $E^2$, as more clearly shown in Fig. 3 of the drawing; the upper portion being hollowed out at $e^1$, and the lower rounded, as at $e^2$, to permit the upper portion $e^1$ to be canted laterally, or raised and lowered and adjusted in position by means of screws, to bring the saw-beams vertically above each other, and parallel, so as to give the saw a true vertical movement, the two pieces composing the brace-piece E being each secured to the table B by screws, or in other suitable manner. H H' represent the two pieces forming what I term the pin-plate, which is attached to the forward end of the lower saw-beam. This pin-plate is more clearly shown in Fig. 2, and will be described in relation thereto. The portion H is provided with a pin, $h$, which works beneath or under the flange of the cam-wheel, while the upper portion H' is provided with a similar pin or projection, $h'$, which works above the flange of the cam-wheel. It is also provided with a small pin or projection, and is slotted to move upon the screw which secures it to the beam. Between the beam and the small pin on the upper portion of the plate H' is a wedge-shaped or key piece, $k$, which is forced in between the beam and the pin upon the upper portion of the plate, when it is desirable to force the pin $h'$ down against the flange of the cam-wheel, and it is intended as a means of taking up the slack which would occur from the wearing of the pin $h'$ against the flange of the cam-wheel, so that the motion imparted to the saw may be steady and even. I represents a cam-wheel, provided with the flange or cam I', made up of arcs of a circle in reverse directions, and said arcs may be greater or smaller, according to the length of stroke required in the saw. The hub of this cam-wheel I is cast in the form of a disk having a projecting flange, $i$, and central opening $i'$, for the passage of the shaft, the shaft being of the usual form, with the exception that attached thereto or cast therewith is a disk, $k'$, which fits within the flange $i$, and is secured thereto by screws or other suitable devices. The object in so constructing the hub of the cam is that the disk may be adjusted and more accurately centered with the cam, the regular movement of the saw being in a great degree dependent upon the proper adjustment of the cam-wheel with relation to its shaft. K represents treadles, by which motion may be imparted to the cam-wheel, though other suitable power may be applied.

The operation of the devices is as follows: The operator, being seated upon the adjustable seat C, can turn the saw, by means of its swivel-connections, to cut in any direction that he may see proper, preferably obliquely toward the right, so that the lumber may be fed in a line from the right shoulder toward the saw, which will enable him to handle the same more readily, and give greater space in which to operate. Motion being imparted by means of the treadle, the pins of the pin-plate attached to the lower saw-beam will ride upon the flange-cam of wheel I, the number of strokes of the saw corresponding, of course, to the number of cams upon the cam-wheel. Any wear of the pins of the pin-plate which interferes with the regularity of movement can be taken up by simply forcing in the wedge $k$, or key, which will force the upper plate downward, bringing it in close contact with the cam-face. Should it be desirable at any time to adjust the saw-beam, this may be done by loosening the screw-connection of the brace E with table B, the parts being again tightened when the proper adjustment has been made.

Having thus described my invention, what I claim, and desire to secure by Letters Patent, is—

1. The combination of the cam-wheel I, pin-plate H H', and the saw-beam, substantially as and for the purpose specified.

2. The pin-plate composed of the portion H and the portion H', slotted, as described.

3. In combination with the saw-beams D D', the divided bracket or brace-beam E, substantially as and for the purpose specified.

In testimony whereof I, the said ROBERT McCONNELL, have hereunto set my hand.

ROBERT McCONNELL.

Witnesses:
F. W. RITTER, Jr.,
W. N. PAXTON.